United States Patent [19]

Ruhmann et al.

[11] Patent Number: 4,497,258
[45] Date of Patent: Feb. 5, 1985

[54] TRANSVERSE BULKHEAD CONNECTION TO FILAMENT WOUND VEHICLE BODY SIDES

[75] Inventors: Douglas C. Ruhmann, Brentwood; Frederick E. Vorwerk, St. Peters; James D. Mundloch, Florissant, all of Mo.

[73] Assignee: ACF Industries, Incorporated, New York, N.Y.

[21] Appl. No.: 429,745

[22] Filed: Sep. 30, 1982

[51] Int. Cl.³ .................. B61D 5/02; B61D 7/02; B61D 49/00

[52] U.S. Cl. .................. 105/248; 105/360; 105/377; 105/406 R; 105/418; 105/424; 298/30

[58] Field of Search .............. 105/238 R, 247, 248, 105/249, 250, 251, 253, 358, 360, 406 R, 411, 413, 414, 415, 416, 417, 418, 419, 420, 424, 377; 298/30

[56] References Cited

U.S. PATENT DOCUMENTS

| | | | |
|---|---|---|---|
| 1,255,174 | 2/1918 | Kadel | 105/248 |
| 1,681,200 | 8/1928 | Suckfield | 105/249 |
| 1,825,235 | 9/1931 | Kiesel, Jr. | 105/249 |
| 3,509,827 | 5/1970 | Sutter | 105/248 |
| 3,577,932 | 5/1971 | Pulcrano et al. | 105/424 X |
| 4,230,048 | 10/1980 | Gordon et al. | 105/358 X |
| 4,292,898 | 10/1981 | Gordon et al. | 105/238 R |

FOREIGN PATENT DOCUMENTS 724422 3/1980 U.S.S.R. .............. 105/424

Primary Examiner—Robert B. Reeves
Assistant Examiner—Howard Beltran
Attorney, Agent, or Firm—Polster, Polster and Lucchesi

[57] ABSTRACT

Bulkhead supports (18) are integrally connected to opposite side portions of a filament wound hopper car body (16). The bulkhead supports include longitudinally spaced extensions (20, 22) extending inwardly from the car body sides. The transverse bulkheads (14) are located within the extensions on either side of the car with longitudinal clearance (31). Resilient bulkhead cushioning members (32) are located between the bulkhead and each extension. The resilient bulkhead cushioning members extend only a short distance transversely to reduce or substantially eliminate the introduction of bending moments into the car body sides when the transverse bulkheads are subjected to lading loads.

9 Claims, 5 Drawing Figures

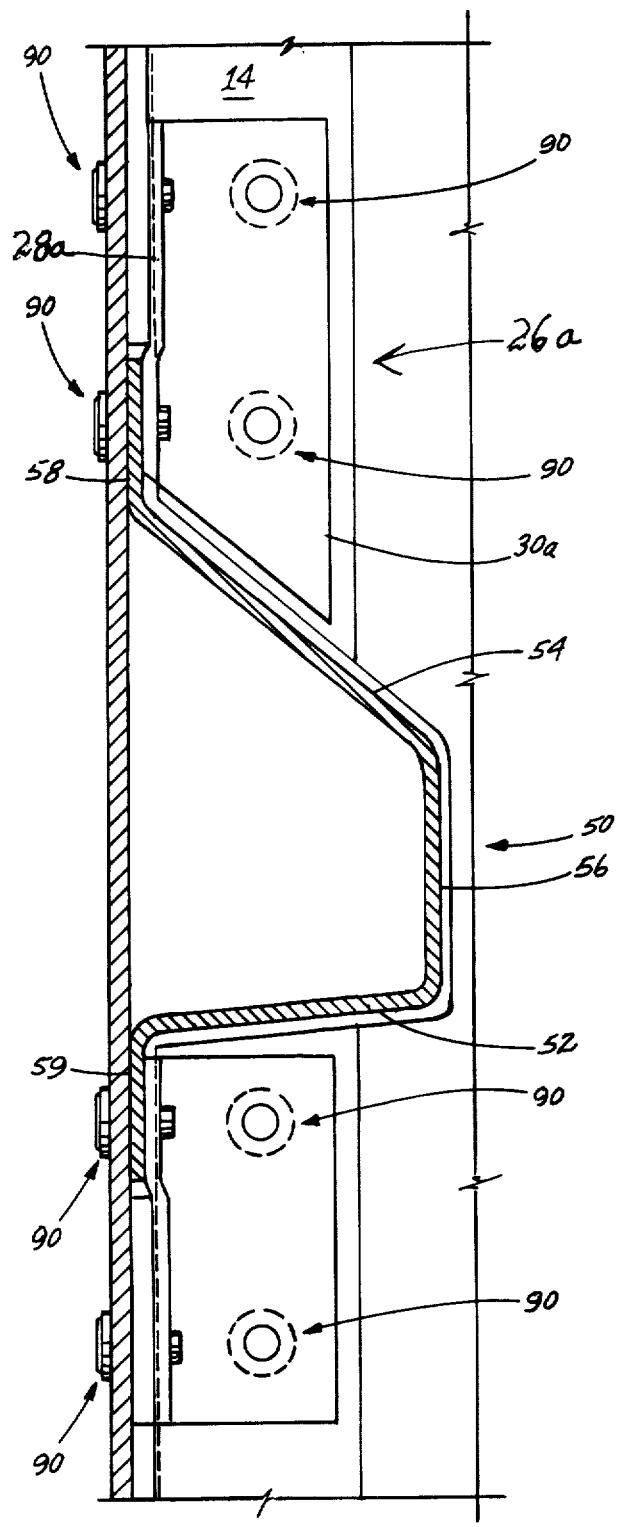
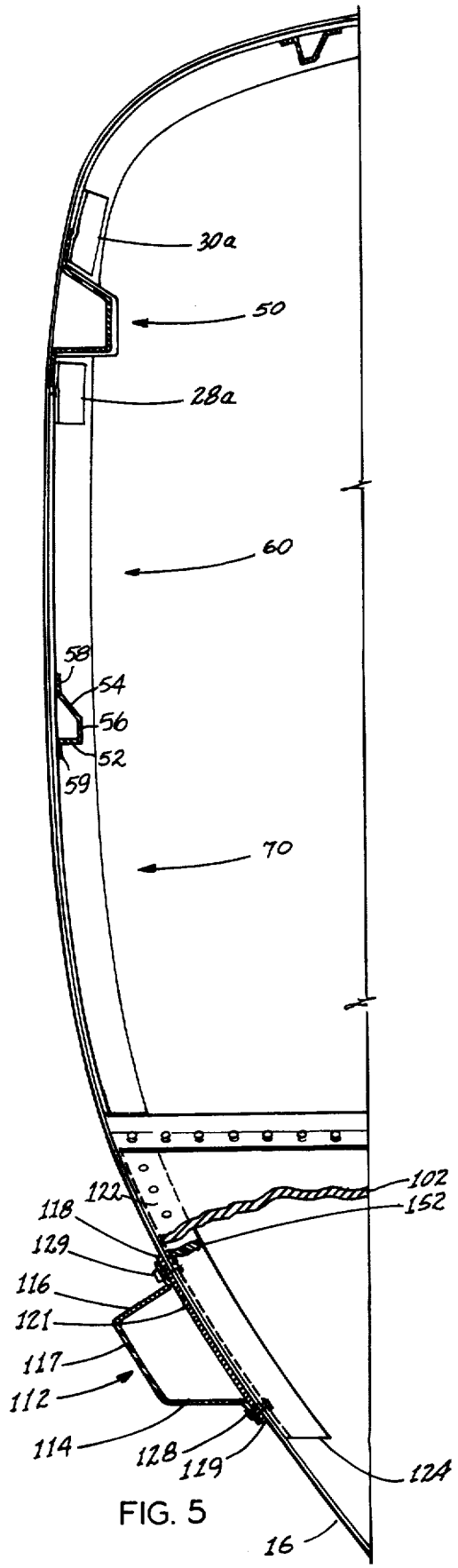
FIG. 4
FIG. 5

TRANSVERSE BULKHEAD CONNECTION TO FILAMENT WOUND VEHICLE BODY SIDES

BACKGROUND OF THE INVENTION

In application Ser. No. 326,796 filed Dec. 3, 1981, a filament wound fiberglass railway hopper car is disclosed in which transversely extending bulkheads and hopper slope sheets are connected to the sides of the filament wound car body by adhesive bonding. However, impact testing of this construction revealed a tendency for bending moments applied by the bulkheads to the sides of the car to peel the adhesively bonded joint.

OBJECT OF THE INVENTION

The object of the present invention is to provide a restraint assembly for the transverse bulkheads which reduces or eliminates the tendency for bending moments applied by the bulkheads to peel the bulkheads from the car sides.

SUMMARY OF THE INVENTION

In accordance with the present invention bulkhead support structure are integrally connected to opposite sides of a filament wound hopper car body. The bulkhead support structure include longitudinally spaced extensions extending inwardly from the car body sides. The transverse bulkheads are located within the extensions on either side of the car with longitudinal clearance. Resilient bulkhead cushioning structure are located between the bulkhead and each extension. The resilient bulkhead cushioning structure extend only a short distance transversely to reduce or substantially eliminate the introduction of bending moments into the car body sides when the transverse bulkheads are subject to lading loads. The resilient cushioning structure preferably extend not more than two (2) inches transversely of the car.

Preferably each bulkhead support structure comprises a pair of angles made of light structural material such as fiberglass or aluminum, in which one leg of the angle extends longitudinally of the car body and is connected to the car body sides with removable fasteners. The other leg of the angle forms one of the bulkhead support extensions extending inwardly from the car body sides.

The bulkhead support structure is preferably discontinuous to allow longitudinally extending top sills on each side of the car to extend longitudinally without interruption. Preferably, however, discontinuous longitudinally extending stiffeners are provided with caps which engage end portions of the stiffeners and which are held in place with the bulkhead support fasteners.

IN THE DRAWINGS

FIG. 4 is a vertical sectional view looking in the direction of the arrows along the line 4—4 in FIG. 1 and rotated 90°.

FIG. 5 is a partial vertical sectional view of a hopper car with which the present invention may be utilized.

DESCRIPTION OF PREFERRED EMBODIMENTS

Figure 1:
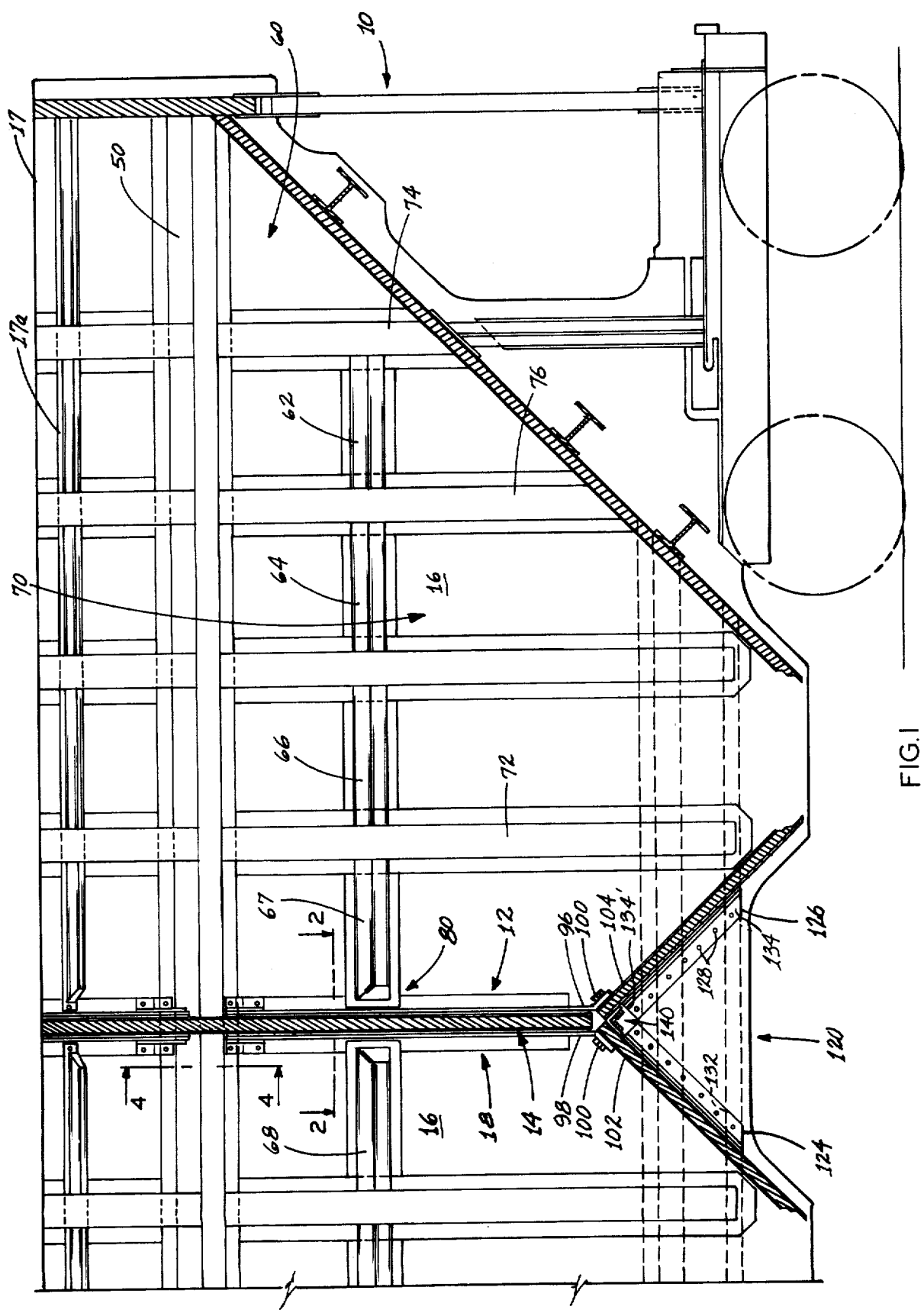
FIG. 1 is a vertical sectional view of a filament wound railway hopper car and illustrating the bulkhead support structure of the present invention.

In the drawings a transportation vehicle is illustrated at 10. In a preferred embodiment the vehicle 10 is a railway hopper car. This car is basically constructed according to the teachings of application Ser. No. 326,796 filed Dec. 3, 1981 hereby incorpodated into this application by this reference.

As pointed out in the Background of the Invention, a difficulty was encountered with the construction shown in the above application in that during impact tests the loadings on the transverse bulkheads tended to cause large bending moments in the car body sides. These bending moments tended to peel the transverse bulkheads from the sides.

To solve this problem, a connection assembly 12 is provided between the transverse bulkheads 14 and the car body sides 16. Connection assembly 12 comprises a bulkhead support means indicated generally at 18 which includes a pair of outwardly extending bulkhead support extensions 20 and 22 (FIG. 2) extending inwardly from the car body wall 16 a distance of, for example, three to ten inches. Extensions 20 and 22 are integrally connected to the car body by respective longitudinally extending flange portions 24 and 26. Respective extensions 20 and 22 and flange portions 24 and 26 are conveniently formed in an integral angle indicated respectively in the drawings at 28 and 30. However, it is within the scope of the present invention to utilize other structural members than angles to constitute the bulkhead support means. However, for present purposes it will be assumed that angles are utilized. Angles 28 and 30 are formed of suitable structural material which utilizes as little weight material as possible. For this reason, light structure materials such as fiberglass and aluminum are preferred.

The transverse bulkheads 14 are received within the extensions 20 and 22 on each side of the car with clearance 31. This clearance is preferably ¼ to 1 inch.

Located on each side of the transverse bulkhead, between the transverse bulkhead and the extensions 20 and 22 are resilient bulkhead cushioning means indicated generally at 32. Resilient bulkhead cushioning structure 32 comprises a pair of short transversely extending members 34 and 36 made of a resilient material and extending not more than about 2" in from the car body walls 16. The transverse extent of the resilient cushioning structure 32 is short to provide a construction whereby lading loads applied to the transverse bulkheads, for example when the car is impacted, do not introduce significantly large bending movements in the hopper car wall 16. Thus the tendency to peel the joint between the transverse bulkheads and the car body side is substantially reduced or eliminated with the construction of the present invention. Resilient cushioning structure 32 is preferably applied in strips extending vertically up the car body sides.

In addition, optional connecting means indicated generally at 40 are provided between the extensions 20 and 22 and the transverse bulkheads 14 to provide a smooth interior surface. Specifically, elastomeric strips 42 and 44 are adhesively bonded to the extensions 20 and 22 and to the transverse bulkhead 14. In one embodiment, vinyl strips are utilized. In general, the transverse bulkhead 14 will be made of wood or wood fibers and will include fiberglass facings 46 and 48 to which the vinyl strips 42 and 44 will respectively be adhesively bonded to.

Hopper car 10 includes a conventional roof 17 with optional longitudinal stiffeners 17a and a top sill 50 (FIG. 1) extending along each side of the car. Top sill 50 includes a pair of webs 52 and 54 joined by a wall portion 56 (FIG. 4). Flange portions 58 and 59 are also provided. Bulkhead support means 18 is discontinuous at the top sill, but is located below and optionally above side plate 50.

Figure 2:
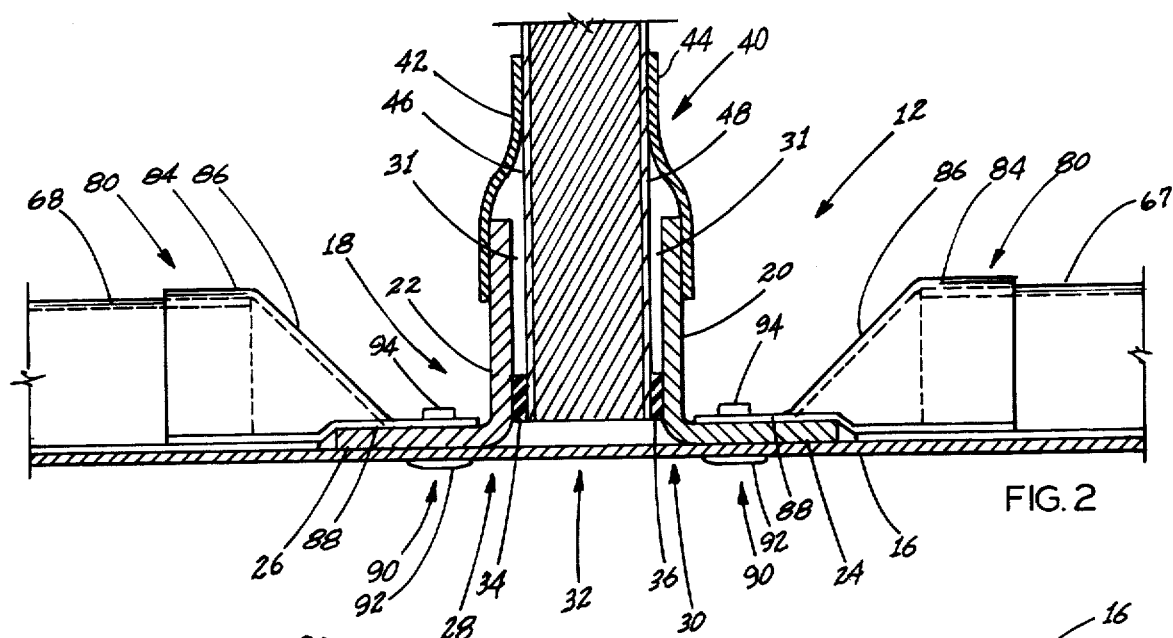
FIG. 2 is a horizontal sectional view looking in the direction of the arrows along the line 2—2 in FIG. 1.
Figure 3:
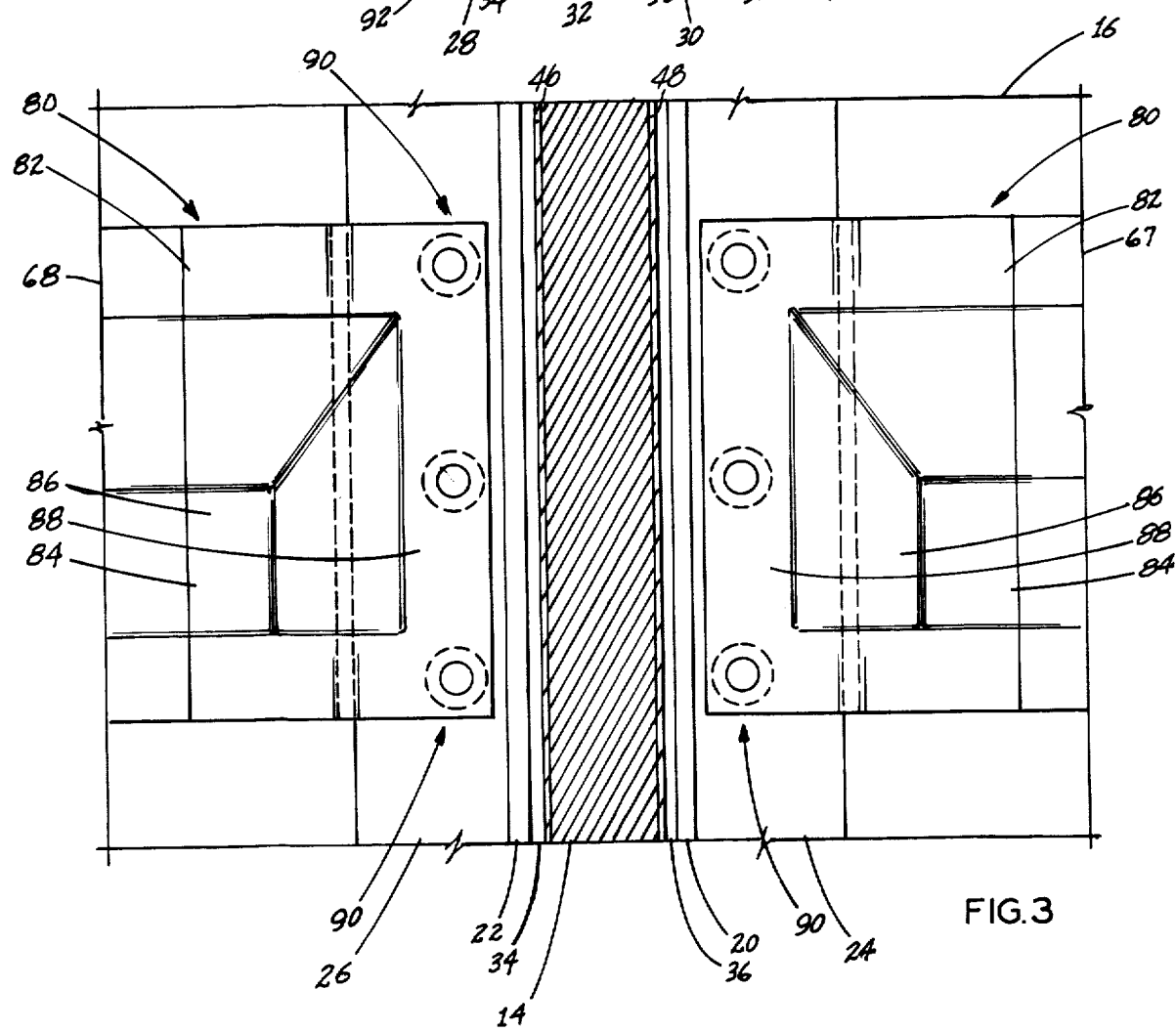
FIG. 3 is an enlarged detail vertical section illustrating the present invention including the cap structure for longitudinal supports.

The hopper vehicle may include discontinuous longitudinally extending stiffeners indicated generally at 60 and including a series of discrete stiffeneing members 62, 64, 66 extending between vertical stiffening means indicated generally at 70 and including a plurality of long vertical stiffeners 72 and vertical stiffeners 74 and 76 which are foreshortened. As shown in FIG. 2, in the area of the bulkhead support means 12, the stiffeners 67 and 68 are provided with cap means indicated generally at 80. Cap means 80 include cap members 82 having a body portion 84 which surrounds the stiffener and a transition portion 86 which follows the contour of the stiffener and terminates in a flange portion 88.

Flange portion 88 is connected to flange portions 24 and 26 with suitable fastening means indicated generally at 90. These fasteners 90 are conveniently Huck bolts having head portions 92 and nuts 94. Fasteners 90 also hold in place optional angles 26a having legs 28a and 30a located above side plate 50.

It is apparent however that with the bulkhead support means including extensions 20 and 22 receiving the bulkheads 14 with clearance and the provision of the resilient cushioning means 34 and 36 extending only a short distance transversely from the car body walls that an improved construction is achieved. The tendency for lading loads applied to the bulkhead during impact to introduce large bending moments into the car body sides and thus tend to peel the bulkheads from the car body sides is substantially reduced or eliminated by the construction of the present invention.

At the lower portion of the connecting structure the extensions 20 and 22 extend downwardly as indicated at 96 and 98. Fasteners 100 then hold these portions 96 and 98 respectively in engagement with hopper slope sheets 102 and 104.

However, as pointed out in the Background of the Invention, a difficulty was encountered in that during impact tests the hopper slope sheets tended to apply a bending moment to the car body sides and side sill. This bending moment tended to tear the slope sheets from the sides and side sill. In order to solve this problem, large steel plates 120 are located between hopper slope sheets 102 and 104. These plates 120 are generally "U" shaped and include portions 124 and 126 extending downwardly generally along slope sheets 102 and 104. An upper body portion 122 (FIG. 2) is located below the jucture of hopper slope sheets 102 and 104 and transverse bulkheads 14.

As shown in FIG. 5, the side sill 112 includes outwardly extending portions 114 and 116 joined by a vertical web portion 117. Upper and lower flange portions 118 and 119 are also provided. A side sill closure plate 121 is also provided outboard of the car body 16. In FIGS. 1 and 5, fasteners 128 connect the lower portions of the plate legs 124 and 126 to the side sill closure plate 121 and the side sill flange portion 119. In addition, fasteners 129 connect the upper portion 122 of the large plates to the car body 16 and to the side sill closure plate 121.

In addition, the large plate 120 is provided with flange portions 132 and 134. As shown in FIG. 2, each of the flange portions 132 and 134 include an opening or slot 134' to receive transversely extending slope sheet reinforcing structure indicated generally at 140. These reinforcing structures preferably comprise light weight structural members such as I beams (not shown).

What is claimed is:

1. A transverse bulkhead restraining assembly comprising: bulkhead support means integrally connected to transversely spaced sides of a filament wound vehicle body; said bulkhead support means including longitudinally spaced extensions extending inwardly from said vehicle body sides; opposite end portions of said transverse bulkheads located within said extensions on both sides of the vehicle with longitudinal clearance; resilient bulkhead cushioning means located adjacent each side and between said bulkhead and each extension on each side of the car; said resilient bulkhead cushioning means extending only a short distance transversely of the vehicle to introduce bulkhead loads into said car body sides primarily in shear.

2. A restraining assembly according to claim 1, wherein each bulkhead support means comprises a pair of angles in which one leg of the angle extends longitudinally of the car body and is integrally connected to the car body sides; and the other leg of the angle forms one of the bulkhead support extensions extending inwardly from the car body sides.

3. A restraining assembly according to claim 2, wherein said one leg is connected to the car body with removable fasteners.

4. A restraining assembly according to claim 2, wherein said angles are made of light structural material.

5. A restraining assembly according to claim 4, wherein said connection is made from fiberglass.

6. A restraining assembly according to claim 4, wherein said connection is made from aluminum.

7. A restraining assembly according to claim 2, wherein the bulkhead support means are discontinuous to allow longitudinally extending top sills on each side of the car to extend longitudinally.

8. A restraining assembly according to claim 7, wherein discontinuous longitudinally extending stiffeners are provided with caps which engage end portions of the stiffeners.

9. A restraining assembly according to claim 7, wherein said caps are held in place with the bulkhead support fasteners.

* * * * *